US011862866B2

(12) United States Patent
Wu et al.

(10) Patent No.: US 11,862,866 B2
(45) Date of Patent: Jan. 2, 2024

(54) ANTENNA MODULE AND ELECTRONIC DEVICE

(71) Applicant: PEGATRON CORPORATION, Taipei (TW)

(72) Inventors: Cheng-Hsiung Wu, Taipei (TW); Chien-Yi Wu, Taipei (TW); Chao-Hsu Wu, Taipei (TW); Hau Yuen Tan, Taipei (TW); Ching-Hsiang Ko, Taipei (TW); Shih-Keng Huang, Taipei (TW); Chia-Hung Chen, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 137 days.

(21) Appl. No.: 17/676,723

(22) Filed: Feb. 21, 2022

(65) Prior Publication Data

US 2022/0328961 A1 Oct. 13, 2022

(30) Foreign Application Priority Data

Apr. 13, 2021 (TW) ................................ 110113154

(51) Int. Cl.
*H01Q 5/364* (2015.01)
*H01Q 1/24* (2006.01)
*H01Q 9/04* (2006.01)

(52) U.S. Cl.
CPC ............ *H01Q 5/364* (2015.01); *H01Q 1/243* (2013.01); *H01Q 9/0421* (2013.01)

(58) Field of Classification Search
CPC .... H01Q 1/2258; H01Q 1/2266; H01Q 1/243; H01Q 1/48; H01Q 5/364; H01Q 9/0421
See application file for complete search history.

(56) References Cited

U.S. PATENT DOCUMENTS 8,648,756 B1 * 2/2014 Desclos ................... H01Q 5/35 343/702
2016/0268671 A1 * 9/2016 Burkhardt .............. H04B 17/23
2018/0219292 A1 * 8/2018 Kenkel .................... H01Q 5/30
(Continued)

FOREIGN PATENT DOCUMENTS

CN 2701906 5/2005
CN 110362159 10/2019
EP 1014486 A1 * 6/2000 ............ H01Q 1/243
(Continued)

*Primary Examiner* — Ab Salam Alkassim, Jr.
*Assistant Examiner* — Leah Rosenberg
(74) *Attorney, Agent, or Firm* — J.C. PATENTS

(57) ABSTRACT

An antenna module includes a first, a second, a third radiators, and a ground radiator. The first radiator includes a first section and a second section. The second radiator is connected to the first radiator, and includes a third section and a fourth section connected to each other. The fourth section includes a feed end. The third radiator is connected to the third section of the second radiator. The ground radiator is connected to the third radiator. The first, the second, the third, and the ground radiator are sequentially connected in a bent manner to form a stepped shape. The first section of the first radiator and the fourth section of the second radiator jointly resonate at a low frequency band, and the second section of the first radiator, the second radiator, the third radiator, and the ground radiator jointly resonate at a high frequency band.

17 Claims, 10 Drawing Sheets

(56) References Cited

U.S. PATENT DOCUMENTS

| | | | | |
|---|---|---|---|---|
| 2022/0021116 | A1* | 1/2022 | Wen | H01Q 5/371 |
| 2022/0344814 | A1* | 10/2022 | Tan | H01Q 21/28 |

FOREIGN PATENT DOCUMENTS

| | | |
|---|---|---|
| TW | 200926502 | 6/2009 |
| TW | 201424563 | 6/2014 |
| TW | 201511413 | 3/2015 |

* cited by examiner

ANTENNA MODULE AND ELECTRONIC DEVICE

CROSS-REFERENCE TO RELATED APPLICATION

This application claims the priority benefit of Taiwanese application serial no. 110113154, filed on Apr. 13, 2021. The entirety of the above-mentioned patent application is hereby incorporated by reference herein and made a part of this specification.

BACKGROUND

Technical Field

This disclosure relates to an antenna module and an electronic device, and in particular to a three-dimensional antenna module and an electronic device.

Description of Related Art

Nowadays, electronic devices are becoming thinner and lighter, and the space of antenna structure inside the electronic device is limited, so it is the direction of research in this field to be able to couple the required frequency band in the limited space.

SUMMARY

The disclosure provides an antenna module having a special shape, capable of coupling a desired frequency band in a limited space.

An antenna module disclosed in this disclosure includes a first radiator, a second radiator, a third radiator, and a ground radiator. The first radiator includes a first section and a second section connected to each other. The second radiator is connected to the first radiator, and the second radiator includes a third section and a fourth section connected to each other. The fourth section includes a feed end. The third radiator is connected to the third section of the second radiator. The ground radiator is connected to the third radiator. The first radiator, the second radiator, the third radiator, and the ground radiator are sequentially connected in a bent manner to form a stepped shape. The first section of the first radiator and the fourth section of the second radiator jointly resonate at a low frequency band, and the second section of the first radiator, the second radiator, the third radiator, and the ground radiator jointly resonate at a high frequency band.

An electronic device of the disclosure includes an insulator, an antenna module, and a metal back cover. The insulator has a stepped contour. The antenna module is arranged on the insulator along the contour of the insulator. The insulator and the antenna module are arranged inside the metal back cover.

Based on the above, the first radiator, the second radiator, the third radiator, and the ground radiator are sequentially connected in a bent manner to form a stepped shape. The antenna module of the disclosure can be used in space-constrained environments by reducing the length and width of the module. In addition, the first section of the first radiator and the fourth section of the second radiator jointly resonate at a low frequency band, and the second section of the first radiator, the second radiator, the third radiator, and the ground radiator jointly resonate at a high frequency band, so that the desired frequency band may be achieved in a limited space.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
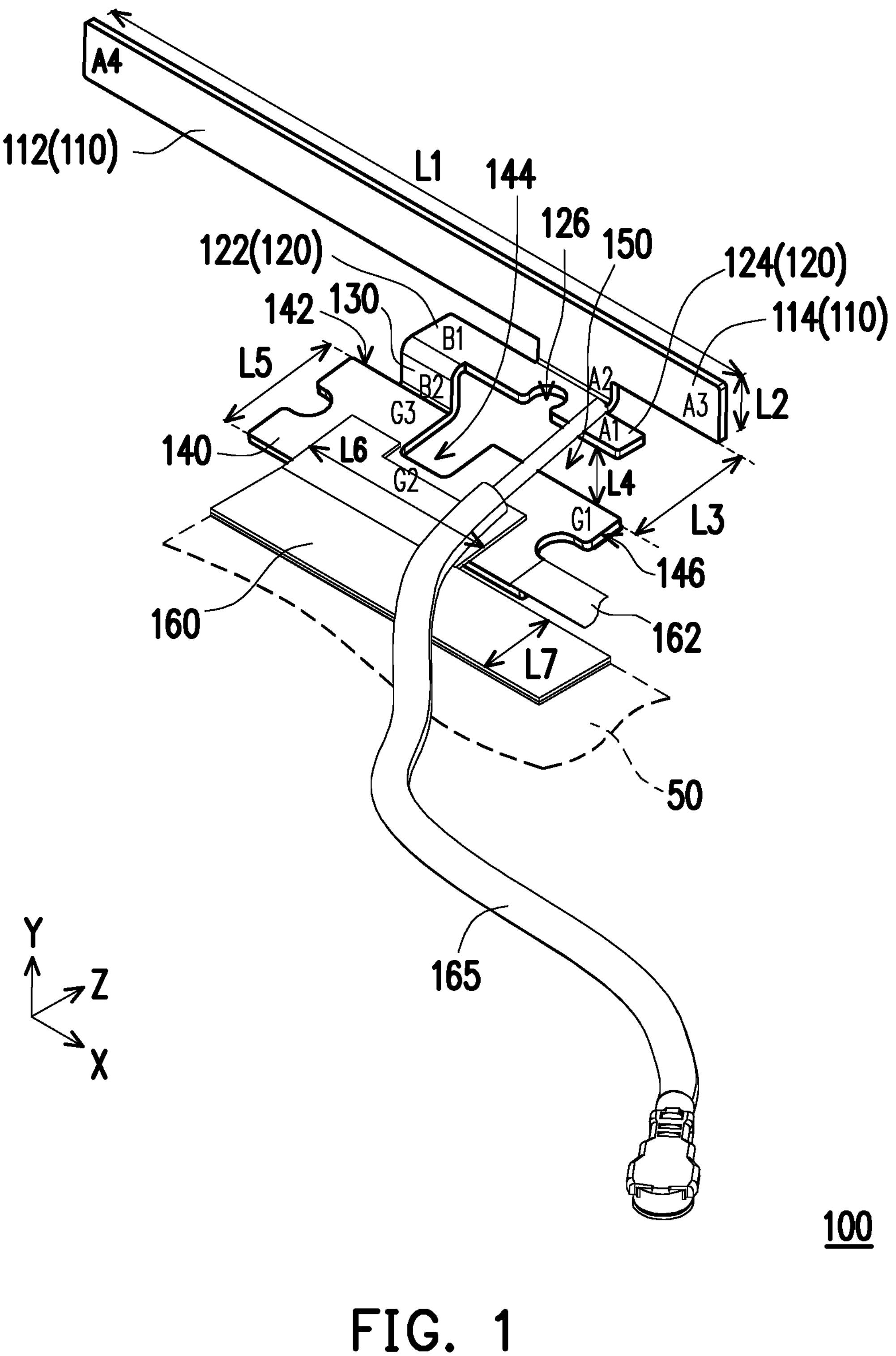
FIG. 1 is a schematic view of an antenna module according to an embodiment of the disclosure.

FIG. 1 is a schematic view of an antenna module according to an embodiment of the disclosure. Referring to FIG. 1, according to this embodiment, an antenna module 100 is a planar inverted-F (PIFA) antenna. The antenna module 100 includes a first radiator 110, a second radiator 120, a third radiator 130, and a ground radiator 140. The first radiator 110, the second radiator 120, the third radiator 130, and the ground radiator 140 are sequentially connected in a bent manner to form a stepped shape.

The first radiator 110 includes a first section 112 and a second section 114 connected to each other. According to this embodiment, the first section 112 and the second section 114 are coplanar, with the first section 112 extending toward the upper left of FIG. 1 and the second section 114 extending toward the lower right of FIG. 1.

The second radiator 120 is connected in a bent manner between the first section 112 and the second section 114 of the first radiator 110 (position A2). According to this embodiment, the second radiator 120 is perpendicularly connected between the first section 112 and the second section 114 of the first radiator 110 (position A2). The second radiator 120 includes a third section 122 and a fourth section 124. According to this embodiment, the third section 122 and the fourth section 124 are coplanar, with the third section 122 extending horizontally toward the upper left of FIG. 1 and the fourth section 124 extending horizontally toward the lower right of FIG. 1. The fourth section 124 includes a feed end (position A1). According to this embodiment, the feed end (position A1) is electrically connected to a positive signal end of a coaxial transmission line 165.

The third radiator 130 is bent, for example, perpendicularly, connected to the third section 122 of the second radiator 120. The ground radiator 140 is bent, for example, perpendicularly, connected to the third radiator 130, and a ground end (position G1) is electrically connected to a negative signal end of the coaxial transmission line.

According to this embodiment, the antenna module 100 is, for example, made of an iron piece integrally formed, but it is not limited thereto. According to other embodiments, the antenna module 100 may also be formed on a flexible printed circuit (FPC) or fabricated on a housing by laser direct structuring (LDS).

It can be seen from FIG. 1 that, according to this embodiment, a length L1 of the first radiator 110 is about 27 mm. A width L2 is about 1.9 mm. A distance L3 between the first radiator 110 and the ground radiator 140 is about 3 mm. A distance L4 between the second radiator 120 and the ground radiator 140 is about 1.1 mm. A size L5 of the ground radiator 140 is about 5 mm. Of course, the size is not limited thereto.

It should be noted that, according to this embodiment, the antenna module 100 is made by, for example, combining an iron piece (the first radiator 110, the second radiator 120, and the third radiator 130) having a length, width, and thickness of about 27 mm, 6 mm, and 0.3 mm with an iron piece (the ground radiator 140) having a length, width, and thickness of about 8.5 mm, 5 mm, and 0.3 mm, and bending the iron pieces into a three-dimensional stepped shape, which may be disposed in a space with a length, width, and height of 27 mm, 3 mm, and 4.95 mm respectively. Due to a reduced size of the stepped antenna module 100 in width, the stepped antenna module 100 may be disposed in a tablet device with a narrow bezel. Of course, types of devices in which the antenna module 100 may be applied are not limited thereto.

In addition, according to this embodiment, the first section 112 of the first radiator 110 and the fourth section 124 of the second radiator 120 (a path formed by positions A1 to A3) jointly resonate at a low frequency band. The low frequency band is, for example, 2400 MHz to 2484 MHz (e.g., Wi-Fi 2.4 GHz), but is not limited thereto. According to this embodiment, a total length of the first section 112 of the first radiator 110 and the fourth section 124 of the second radiator 120 (the path formed by the positions A1 to A3) is ¼ wavelength of the low frequency band.

The second section 114 of the first radiator 110 and the fourth section 124 of the second radiator 120 (the path formed by the positions A1, A2, and A3) and the second radiator 120, the third radiator 130, and the ground radiator 140 (a path formed by positions A1, B1, B2, G3, G2, and G1) jointly resonate at a high frequency band. The high frequency band is, for example, 5150 MHz to 5850 MHz (e.g., Wi-Fi 5 GHz), but is not limited thereto. According to this embodiment, a total length of the second section 114 of the first radiator 110 and the fourth section 124 of the second radiator 120 is ¼ wavelength of the high frequency band, and a total length of the second radiator 120, the third radiator 130, and the ground radiator 140 (the path formed by the positions A1, B1, B2, G3, G2, and G1) is ¼ wavelength to ½ wavelength of the high frequency band. Therefore, the antenna module 100 may achieve a desired frequency band in a limited space.

Figure 2:
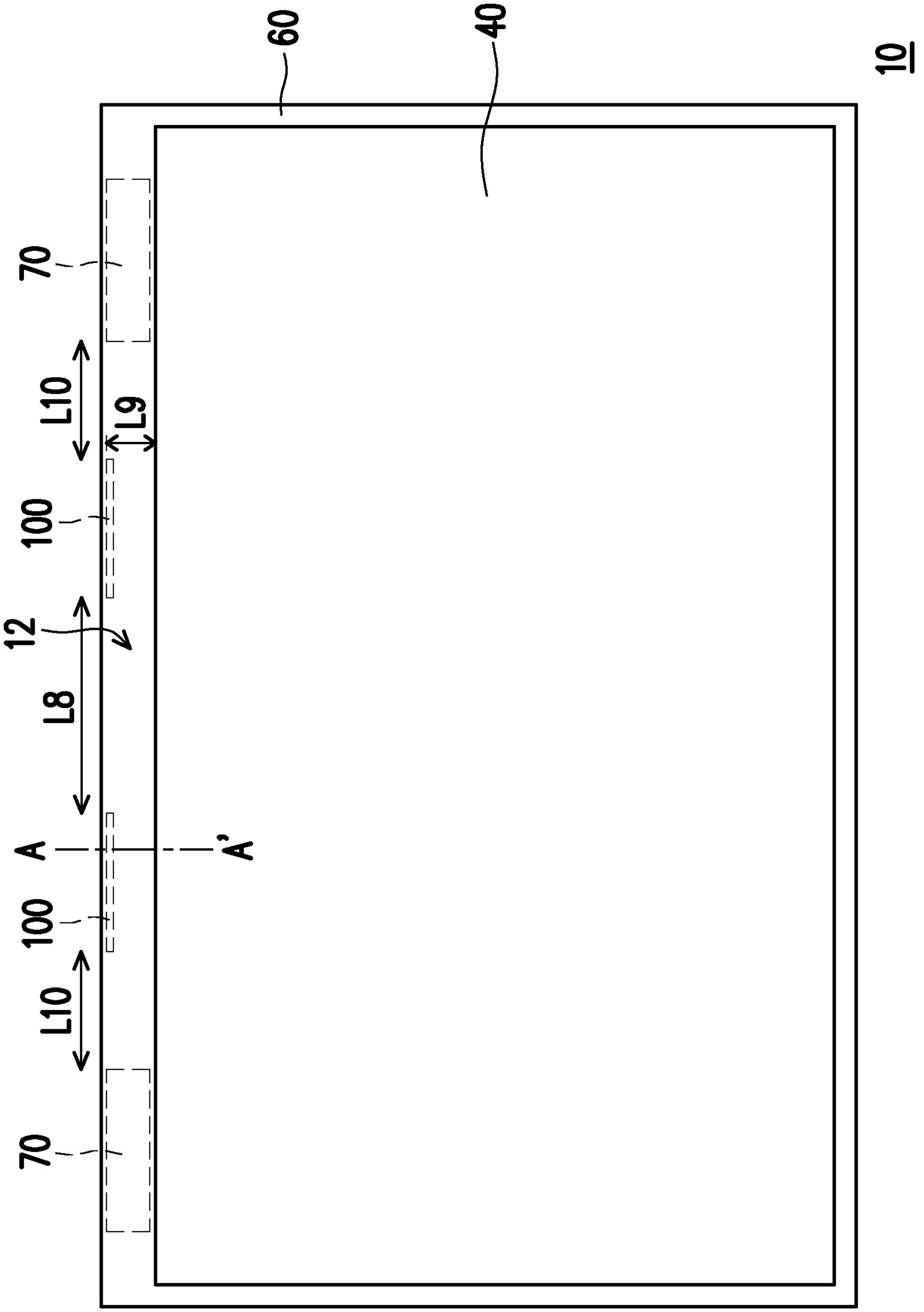
FIG. 2 is a schematic view of an electronic device according to an embodiment of the disclosure.

FIG. 2 is a schematic view of an electronic device according to an embodiment of the disclosure. Referring to FIG. 2, according to this embodiment, an electronic device 10 is, for example, a tablet computer with a narrow bezel, but is not limited thereto. The electronic device 10 includes two antenna modules 100 of FIG. 1 and has a multi-antenna structure. The two antenna modules 100 are located in a bezel region 12 at an outer edge of a display panel 40. A distance L8 between the two antenna modules 100 is between 60 mm and 80 mm, which is about 70 mm.

Figure 3:
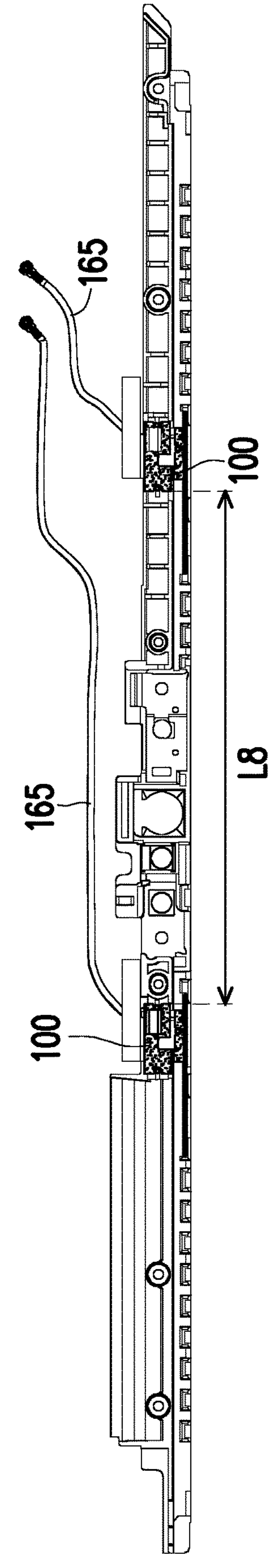
FIG. 3 is a schematic top view of two antenna modules of the electronic device of FIG. 2 disposed on an insulator.

FIG. 3 is a schematic top view of two antenna modules of the electronic device of FIG. 2 disposed on an insulator. Referring to FIG. 3, according to this embodiment, the two antenna modules 100 are disposed on an insulator 20. Since the two antenna modules 100 are of a same shape, they can share a same set of mold to achieve a goal of antenna sharing and cost saving. The two antenna modules 100 are soldered with two coaxial transmission lines 165 of 50 mm and 150 mm, respectively, and are connected to a module card (not shown) of a motherboard (not shown) through the two coaxial transmission lines 165.

Figure 4:
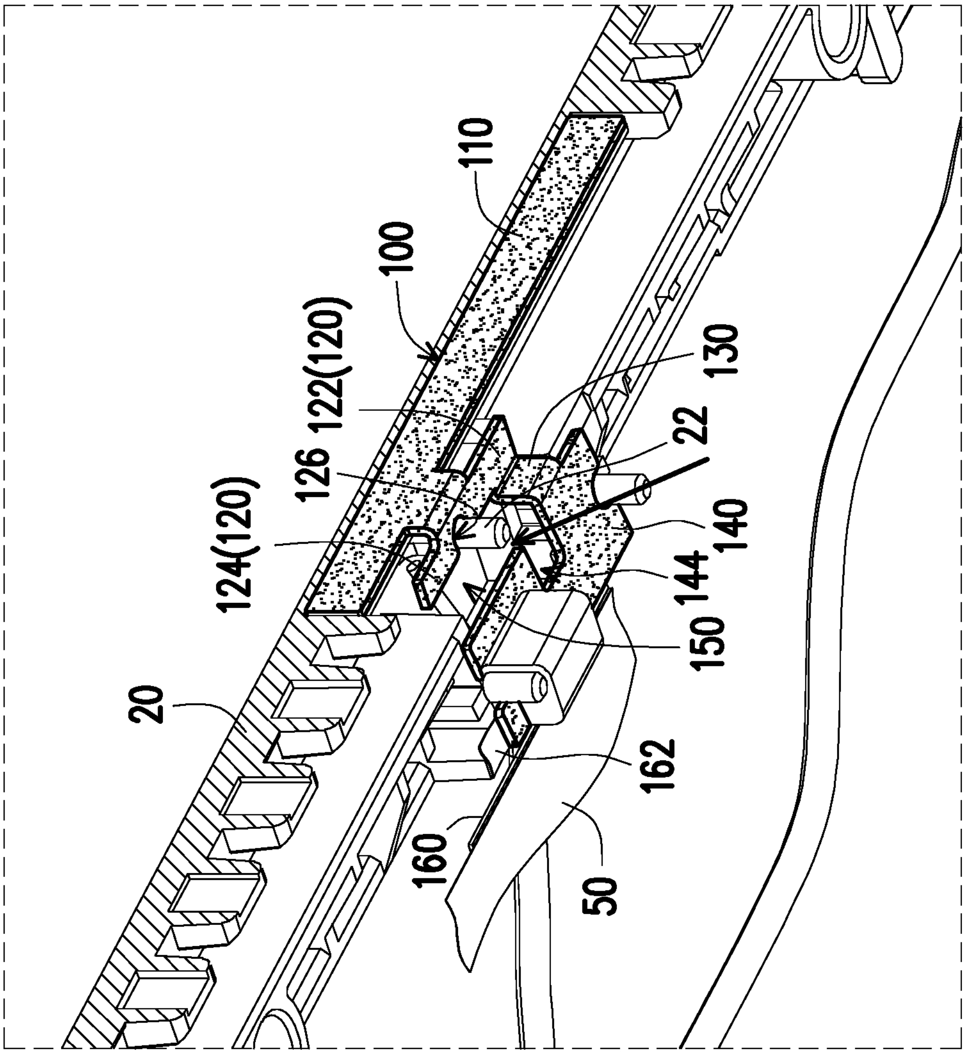
FIG. 4 is a partial three-dimensional schematic view of FIG. 3.

FIG. 4 is a partial three-dimensional schematic view of FIG. 3. Referring to FIG. 4, according to this embodiment, the insulator 20 has a stepped contour. The antenna module 100 is arranged on the insulator 20 along the contour of the insulator 20. According to this embodiment, the second radiator 120 includes a positioning hole 126 located between the third section 122 and the fourth section 124. The positioning hole 126 may be used for positioning the antenna module 100 on the insulator 20 by, for example, passing through a bolt pillar 22. In addition, the antenna module 100 may be fixed to a plastic insulator 20 by hot-melt, and has good and stable wireless performance.

Figure 5:
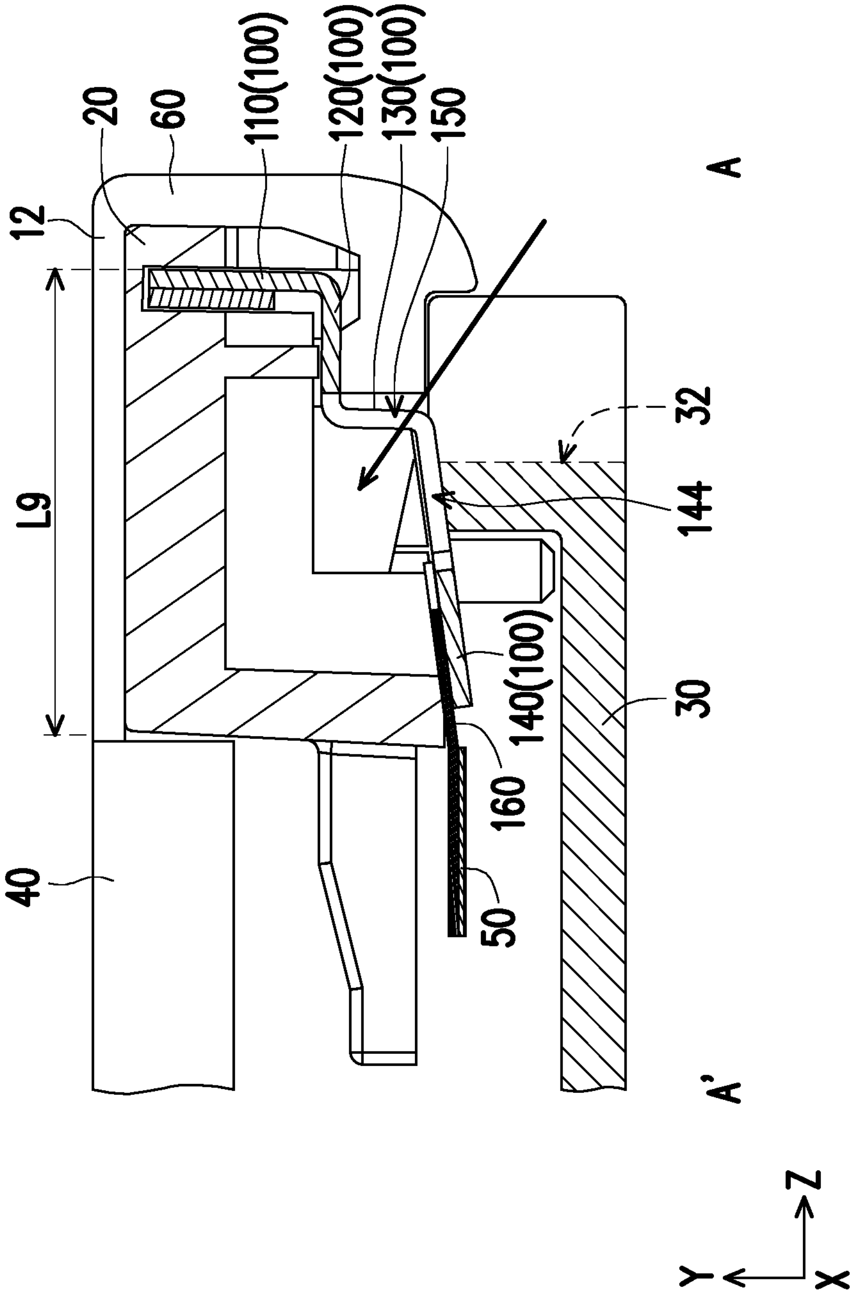
FIG. 5 is a schematic cross-sectional view taken along a line A to A' of FIG. 2.

Referring to FIG. 5, FIG. 5 is a schematic cross-sectional view taken along a line A to A' of FIG. 2. According to this embodiment, the electronic device 10 includes an insulator 20, an antenna module 100, a metal back cover 30, a display panel 40, and a front bezel 60.

The front bezel 60 is disposed beside the display panel 40. According to this embodiment, a width L9 of the front bezel 60 is about 7.5 mm. The metal back cover 30 is disposed below the display panel 40 and the front bezel 60. The display panel 40 is arranged opposite to the metal back cover 30. The antenna module 100 and the insulator 20 are located in the bezel region 12 at the outer edge of the display panel 40, and are disposed between the front bezel 60 and the metal back cover 30.

It should be noted that, as shown in FIG. 5, according to this embodiment, the first radiator 110 of the antenna module 100 is perpendicular to the display panel 40. Since a side of the tablet device needs to be tested for specific absorption rate (SAR), if the antenna module 100 is in a form of a plane, a radiation pattern will be in a Z-direction (to the right) as shown in FIG. 5, and it will be difficult to meet the test standard. Planar antennas often require reduced antenna transmitting power to meet the SAR standard.

According to this embodiment, the antenna module 100 is in a stepped shape and the first radiator 110 of the antenna module 100 is perpendicular to the display panel 40, such that the radiation pattern is oriented in a Y direction (upward) as shown in FIG. 5. In this way, the designer does not need to reduce the antenna transmitting power, a SAR value of the electronic device 10 at the right side of FIG. 5 may meet the standard, and has better performance.

In addition, according to this embodiment, the first radiator 110 of the antenna module 100 is designed to be perpendicularly away from the metal back cover 30, so that radiated energy of the antenna in the Y direction has a characteristic of omnidirectional radiation.

It should be noted that, referring to FIG. 1 and FIG. 5, according to this embodiment, the antenna module 100 further includes an air outlet 150 formed between the second radiator 120 and the ground radiator 140 and located beside the third radiator 130. The ground radiator 140 includes a first edge 142 connected to the third radiator 130, a second edge 146 adjacent to the first edge 142, and a notch 144 recessed from the first edge 142. The notch 144 is connected to the air outlet 150. A length and a width of the notch 144 are, for example, 2 mm, but not limited thereto. The air outlet 150 and the notch 144 are used for air flow to enhance heat dissipation.

As shown in FIG. 5, according to this embodiment, the metal back cover 30 includes an opening 32 corresponding to and connected to the air outlet 150. An air flow (such as an arrow in FIG. 4 and FIG. 5) is suitable to flow into or out of the metal back cover 30 through the opening 32 of the metal back cover 30 and the air outlet 150 and the recess 144 of the antenna module 100 to achieve an effect of heat dissipation.

Furthermore, returning to FIG. 1, according to this embodiment, the antenna module 100 further includes a first conductor 160 attached to the ground radiator 140 and extending to a system ground plane 50 in a direction away from the third radiator 130. The system ground plane 50 is, for example, a bare copper region of the motherboard, but is not limited thereto. A size L6 of a portion of the first conductor 160 above the ground radiator is about 8.5 mm, and a size L7 of a portion of the first conductor 160 outside the ground radiator is about 3 mm. The first conductor 160 is, for example, aluminum foil or copper foil, but is not limited thereto.

The antenna module 100 further includes a second conductor 162. The ground radiator 140 includes the second edge 146 adjacent to the first edge 142, and the second edge 146 is close to the feed end (position A1). The second conductor 162 is attached to the second edge 146 of the ground radiator 140 to ground. Specifically, the second conductor 162 is attached to the second edge 146 of the ground radiator 140 and extends to the metal back cover 30 (shown in FIG. 5). Such a design enhances antenna performance of the antenna module 100 at Wi-Fi 2.4 GHz and Wi-Fi 5 GHz. The second conductor 162 is, for example, conductive foam, but is not limited thereto.

According to this embodiment, the first conductor 160 and the second conductor 162 constitute two inductive grounding, increasing an area of antenna grounding and making a system grounding complete, which may effectively improve stability of a wireless transmission system and wireless transmission performance.

Figure 6:
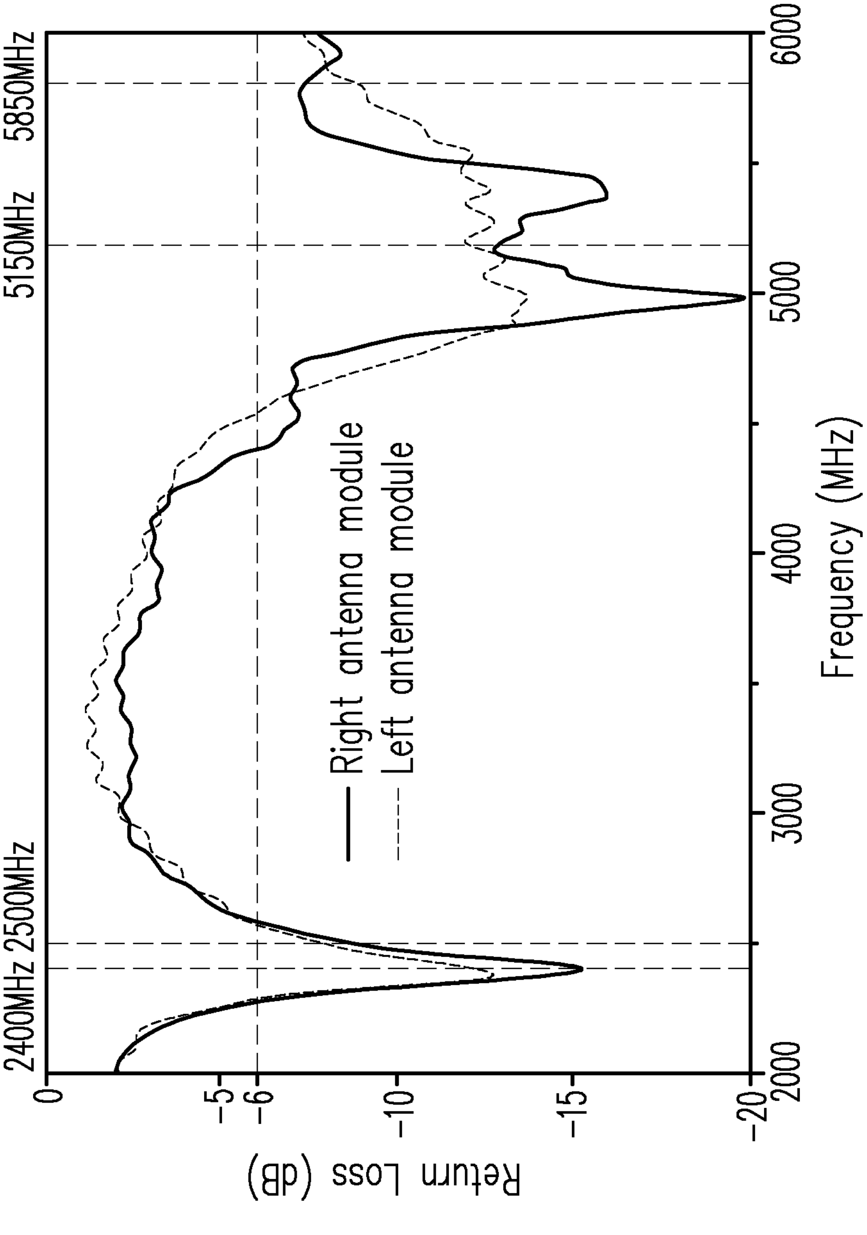
FIG. 6 shows a frequency-return loss relationship of the two antenna modules in FIG. 3.

FIG. 6 shows a frequency-return loss relationship of the two antenna modules in FIG. 3. Referring to FIG. 6, according to this embodiment, the two antenna modules 100 may have good performance with return loss below −6 dB (VSWR=3).

Figure 7:
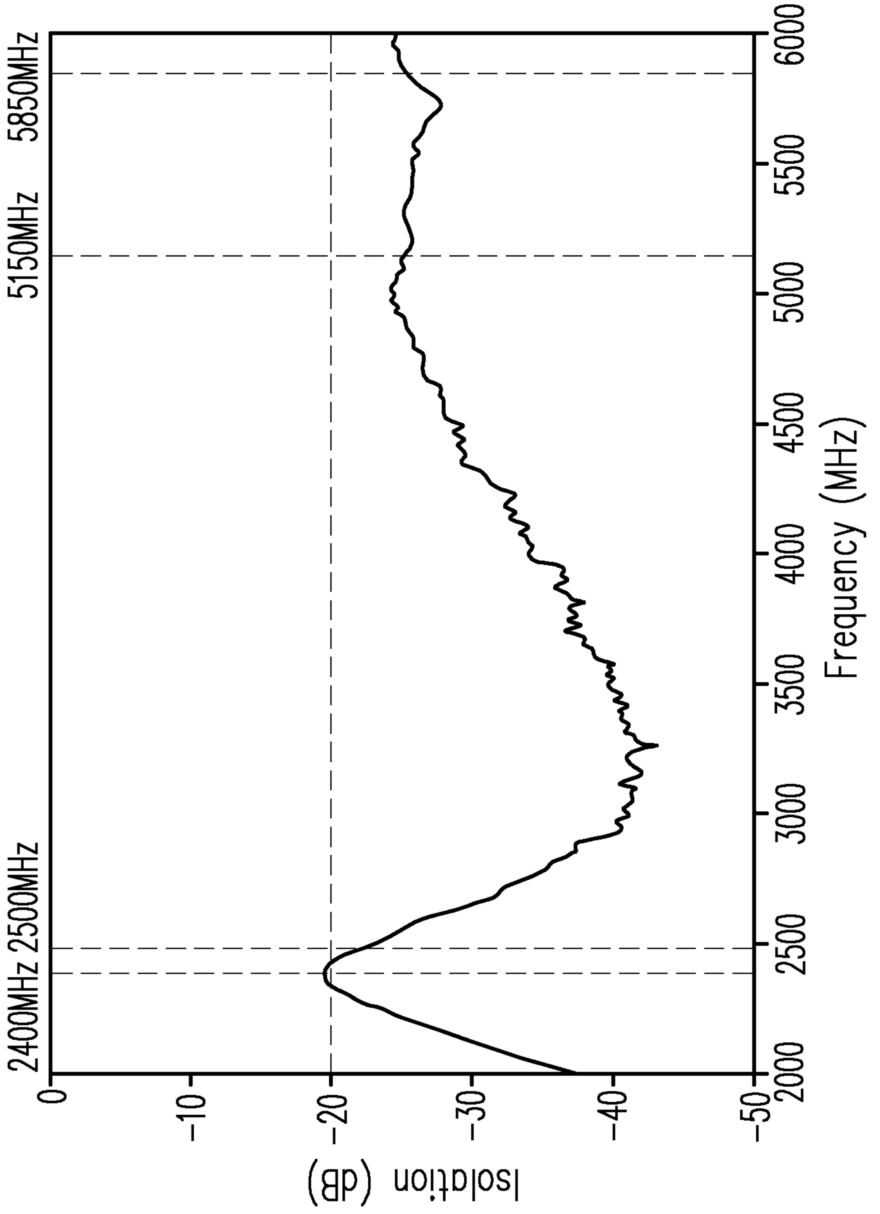
FIG. 7 shows a frequency-isolation relationship of the two antenna modules in FIG. 3.

FIG. 7 shows a frequency-isolation relationship of the two antenna modules in FIG. 3. Referring to FIG. 3 and FIG. 7, according to this embodiment, the distance L8 between the two antenna modules 100 in FIG. 3 is about 70 mm, and isolation may be less than −15 dB, or even close to −20 dB, which has good isolation performance.

Figure 8:
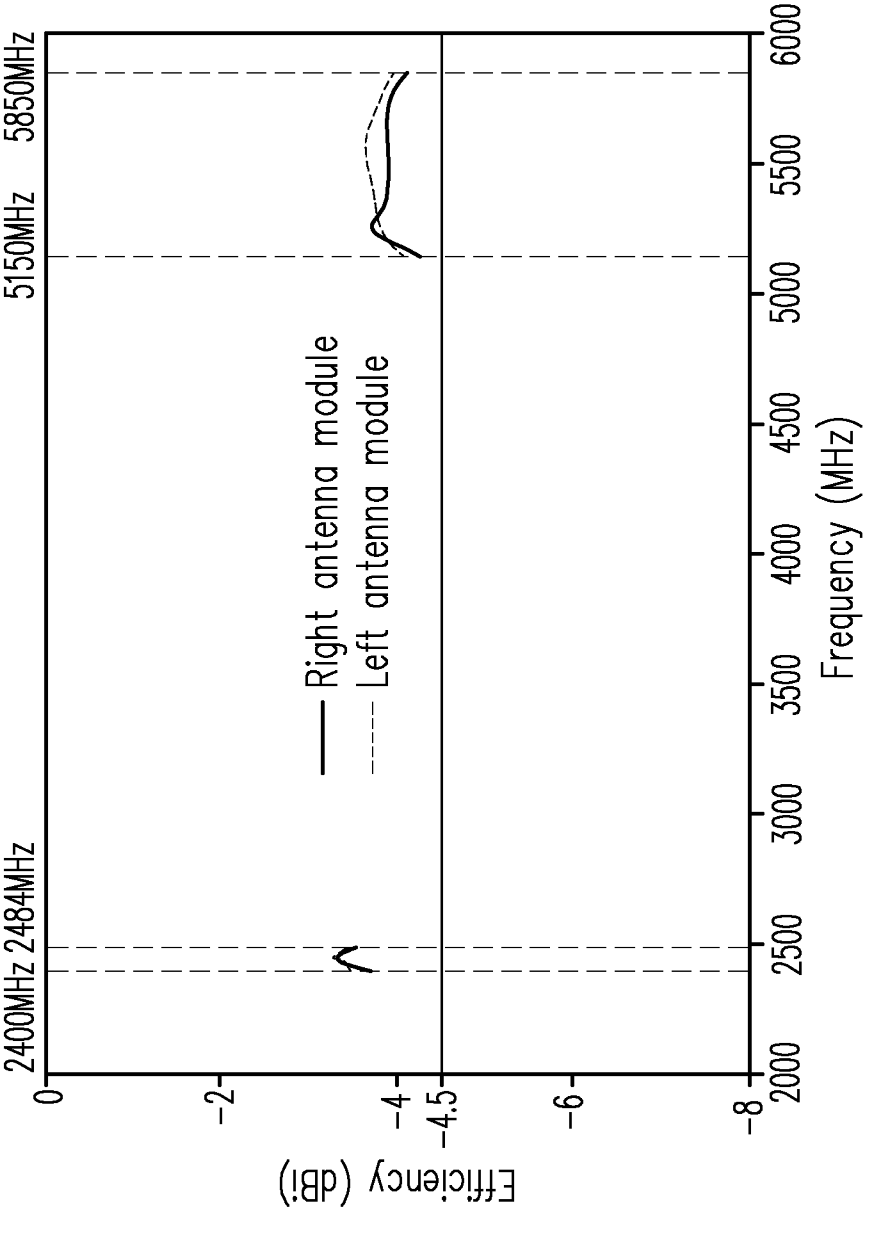
FIG. 8 shows a frequency-antenna efficiency relationship of two antenna modules on an electronic device of FIG. 1.

FIG. 8 shows a frequency-antenna efficiency relationship of two antenna modules on an electronic device of FIG. 1. Referring to FIG. 8, the antenna efficiency of the two antenna modules 100 may be above −4.5 dBi in both low frequency Wi-Fi 2.4 GHz and high frequency Wi-Fi 5 GHz with good performance.

Returning to FIG. 2, according to this embodiment, in addition to the two antenna modules 100 of FIG. 1, the electronic device 10 may also be provided with two planar antennas 70, which together constitute an application of 4×4 MIMO multi-antenna technology. The two planar antennas 70 are located on both sides of the two antenna modules 100, and a distance L10 between the planar antenna 70 and the antenna module 100 is 20 mm. The planar antenna 70 may be printed on a circuit board and arranged flat in the bezel region 12. Of course, according to other embodiments, the two planar antennas 70 may be omitted or, alternatively, the two planar antennas 70 may be replaced by two additional antenna modules 100.

Figure 9:
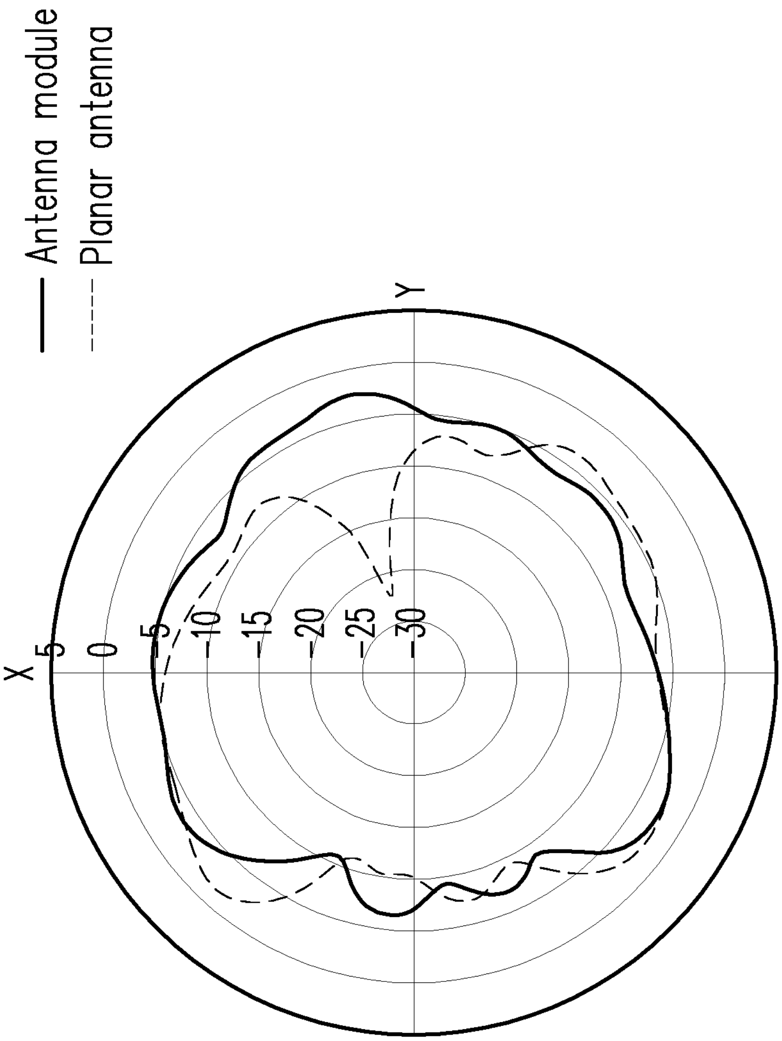
FIG. 9 and FIG. 10 show patterns of the antenna module and a planar antenna of the electronic device of FIG. 1 in an X-Y plane at low frequency and high frequency, respectively.
Figure 10:
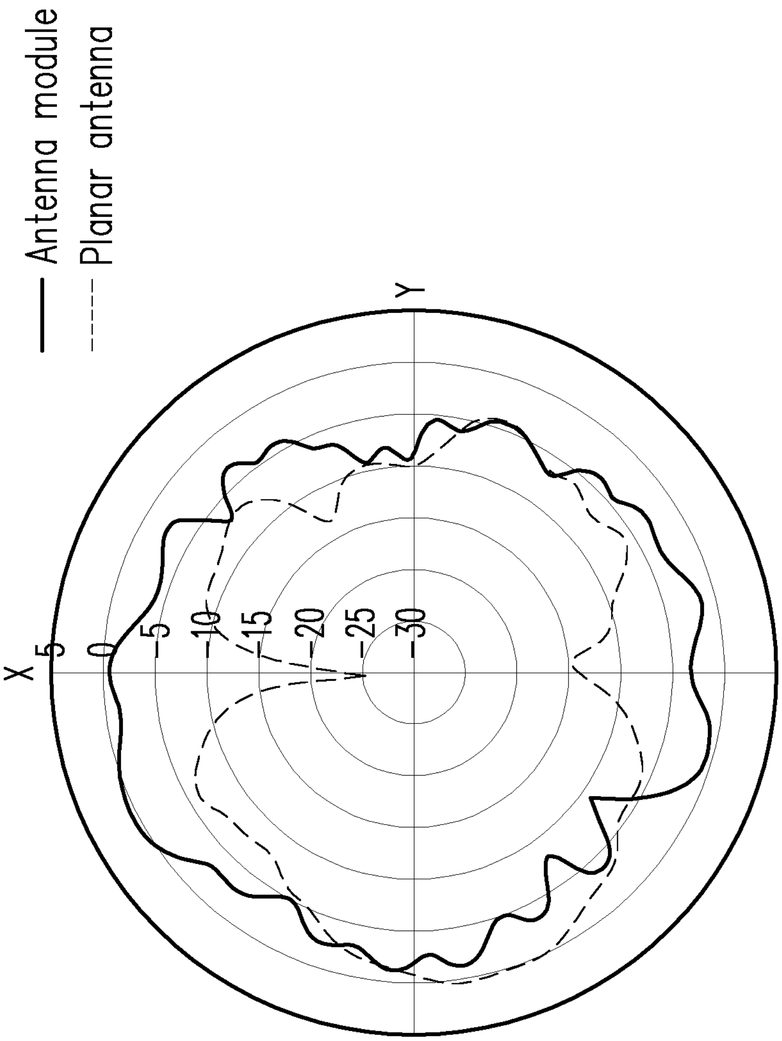

FIG. 9 and FIG. 10 show patterns of the antenna module and a planar antenna of the electronic device of FIG. 1 in an X-Y plane at low frequency and high frequency, respectively. Referring to FIG. 9 first, at low frequency (frequency point at Wi-Fi 2.4 GHz), the antenna module 100 has better radiation pattern in a +Y direction. Referring to FIG. 10, at high frequency (frequency point at Wi-Fi 5 GHz), the antenna module 100 has better radiation pattern in a +X direction and a −X direction.

In summary, the second radiator of the antenna module of the disclosure is connected in a bent manner to a portion between the first section and the second section of the first radiator. The fourth section of the second radiator includes the feed end. The third radiator is connected in a bent manner to the third section of the second radiator, and the ground radiator is connected in a bent manner to the third radiator. The first radiator, the second radiator, the third radiator, and the ground radiator are sequentially connected in a bent manner to form a stepped shape. With the above design, the antenna module of the disclosure can be used in space-constrained environments by reducing the length and width of the module. In addition, the first section of the first radiator and the fourth section of the second radiator jointly resonate at a low frequency band, and the second section of the first radiator, the second radiator, the third radiator, and the ground radiator jointly resonate at a high frequency band, so that the desired frequency band may be achieved in a limited space.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An antenna module comprising:

a first radiator comprising a first section and a second section connected to each other;

a second radiator connected to the first radiator, wherein the second radiator comprises a third section and a fourth section connected to each other, and the fourth section comprises a feed end;

a third radiator connected to the third section of the second radiator; and a ground radiator connected to the third radiator, wherein the first radiator, the second radiator, the third radiator, and the ground radiator are sequentially connected in a bent manner to form a stepped shape, the first section of the first radiator and the fourth section of the second radiator jointly resonate at a low frequency band, and the second section of the first radiator, the second radiator, the third radiator, and the ground radiator jointly resonate at a high frequency band.

2. The antenna module according to claim 1, wherein a total length of the first section of the first radiator and the fourth section of the second radiator is ¼ wavelength of the low frequency band.

3. The antenna module according to claim 1, wherein a total length of the second section of the first radiator and the fourth section of the second radiator is ¼ wavelength of the high frequency band.

4. The antenna module according to claim 1, wherein a total length of the second radiator, the third radiator, and the ground radiator is ¼ wavelength to ½ wavelength of the high frequency band.

5. The antenna module according to claim 1, wherein the antenna module comprises an air outlet formed between the second radiator and the ground radiator, and located next to the third radiator.

6. The antenna module according to claim 5, wherein the ground radiator comprises a first edge connected to the third radiator and a notch recessed inward from the first edge, wherein the notch is connected to the air outlet.

7. The antenna module according to claim 1 further comprising:
- a first conductor attached to the ground radiator and extending to a system ground plane in a direction away from the third radiator.

8. The antenna module according to claim 1, wherein the ground radiator comprises a first edge connected to the third radiator and a second edge adjacent to the first edge, wherein the second edge and the feed end are located on a same side, and the antenna module further comprises: a second conductor attached to the second edge of the ground radiator.

9. An electronic device comprising:
- an insulator having a stepped contour;
- an antenna module arranged on the insulator along the contour of the insulator and comprising:
  - a first radiator comprising a first section and a second section connected to each other;
  - a second radiator connected to the first radiator, wherein the second radiator comprises a third section and a fourth section connected to each other, and the fourth section comprises a feed end;
  - a third radiator connected to the third section of the second radiator; and
  - a ground radiator connected to the third radiator, wherein the first radiator, the second radiator, the third radiator, and the ground radiator are sequentially connected in a bent manner to form a stepped shape, the first section of the first radiator and the fourth section of the second radiator jointly resonate at a low frequency band, and the second section of the first radiator, the second radiator, the third radiator, and the ground radiator jointly resonate at a high frequency band; and
- a metal back cover, wherein the insulator and the antenna module are arranged inside the metal back cover.

10. The electronic device according to claim 9 further comprising:
- a display panel disposed opposite to the metal back cover, wherein the insulator and the antenna module are located in a bezel region at an outer edge of the display panel, and the first radiator of the antenna module is perpendicular to the display panel.

11. The electronic device according to claim 9, wherein a total length of the first section of the first radiator and the fourth section of the second radiator is ¼ wavelength of the low frequency band.

12. The electronic device according to claim 9, wherein a total length of the second section of the first radiator and the fourth section of the second radiator is ¼ wavelength of the high frequency band.

13. The electronic device according to claim 9, wherein a total length of the second radiator, the third radiator, and the ground radiator is ¼ wavelength to ½ wavelength of the high frequency band.

14. The electronic device according to claim 9, wherein the antenna module comprises an air outlet formed between the second radiator and the ground radiator, and located next to the third radiator.

15. The electronic device according to claim 14, wherein the ground radiator comprises a first edge connected to the third radiator and a notch recessed inward from the first edge, wherein the notch is connected to the air outlet.

16. The electronic device according to claim 9, wherein the antenna module further comprises:
- a first conductor attached to the ground radiator and extending to a system ground plane in a direction away from the third radiator.

17. The electronic device according to claim 9, wherein the ground radiator comprises a first edge connected to the third radiator and a second edge adjacent to the first edge, wherein the second edge and the feed end are located on a same side, and the antenna module further comprises: a second conductor attached to the second edge of the ground radiator.

* * * * *